United States Patent [19]

Puppel

[11] Patent Number: 4,974,722

[45] Date of Patent: Dec. 4, 1990

[54] MULTI-STRAND CHAIN CONVEYOR

[75] Inventor: Alfred Puppel, Wuppertal, Fed. Rep. of Germany

[73] Assignee: RUD-Kettenfabrik Reiger & Dietz GmbH u. Co., Aalen, Fed. Rep. of Germany

[21] Appl. No.: 293,349

[22] Filed: Jan. 4, 1989

[30] Foreign Application Priority Data

Jan. 6, 1988 [DE] Fed. Rep. of Germany ....... 3800342

[51] Int. Cl.⁵ .............................................. B65G 19/24
[52] U.S. Cl. ..................................... 198/731; 198/733
[58] Field of Search ......................... 198/731, 733, 716

[56] References Cited

U.S. PATENT DOCUMENTS 1,016,192  1/1912  White ................................. 198/731

FOREIGN PATENT DOCUMENTS

| 0678241 | 7/1939 | Fed. Rep. of Germany | ...... 198/731 |
| 528514 | 5/1956 | Fed. Rep. of Germany | ...... 198/731 |
| 1853977 | 6/1962 | Fed. Rep. of Germany | . |
| 1931880 | 1/1966 | Fed. Rep. of Germany | . |
| 2105960 | 8/1972 | Fed. Rep. of Germany | ...... 198/831 |
| 3304601 | 8/1984 | Fed. Rep. of Germany | . |
| 0468918 | 4/1969 | Switzerland | ......................... 198/731 |
| 0594924 | 2/1978 | U.S.S.R. | ............................... 198/731 |
| 1057487 | 1/1967 | United Kingdom | ................ 198/731 |
| 2138764 | 10/1984 | United Kingdom | ................ 198/731 |

Primary Examiner—Joseph E. Valenza
Assistant Examiner—James R. Bidwell
Attorney, Agent, or Firm—Mark P. Stone

[57] ABSTRACT

In a multi-strand chain conveyor having conveying members (1) which are connected via coupling elements (2) to connecting links (9) of identical orientation of adjacent chain strands (17, 18, 19), projections (5) of the coupling elements (2) engage into the clear inner spaces (14) of connecting links (9) of the outer chain strands (17, 18) in a manner such that their ends point in different directions. As a result of the different direction of engagement of the ends of the projections (5) into the connecting links (9), undesired twisting of the outer chain strands (17, 18) are countered and in this manner the security of the connection between the conveying members (1) and the chain strands (17, 18, 19) is increased.

10 Claims, 3 Drawing Sheets

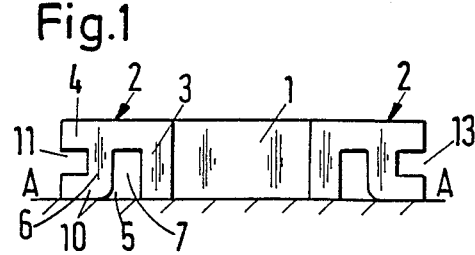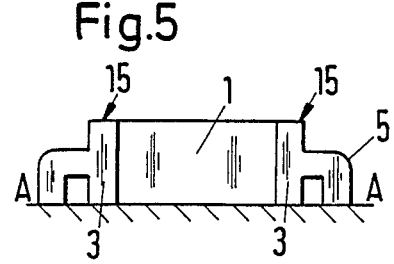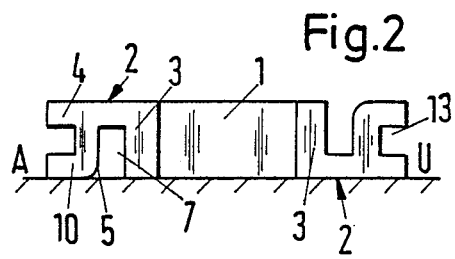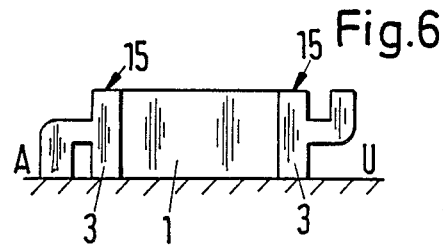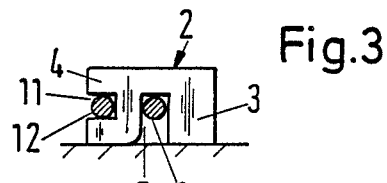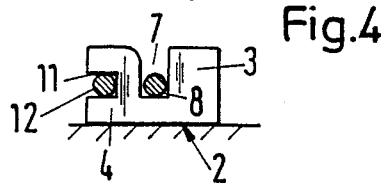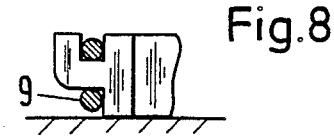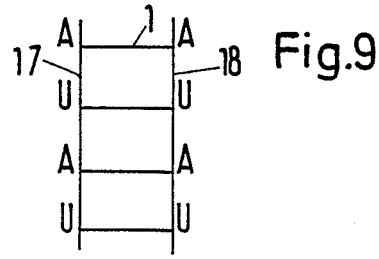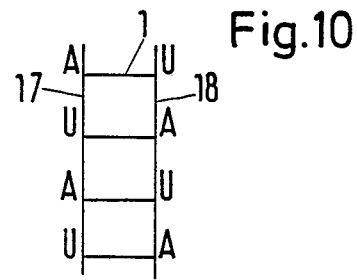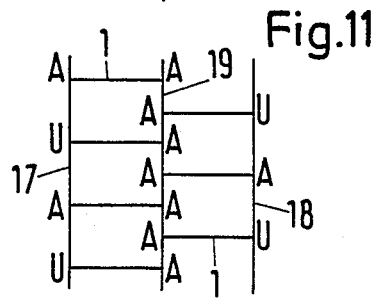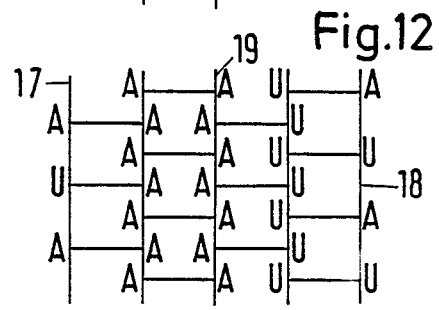

MULTI-STRAND CHAIN CONVEYOR

BACKGROUND OF THE INVENTION

The invention relates to a multi-strand chain conveyor, in which the conveying members are provided with two coupling elements engaging in identically oriented connecting links of adjacent chain strands, each of the coupling elements possessing an angled projection, one leg of which largely fills the clear interior space of the connecting link associated to it and the other leg of which, forming an angled free end, engages in each case behind a longitudinal side of the connecting chain link.

In a chain conveyor of the abovementioned type which is known from German Utility Model 1,931,880 the coupling elements are formed by pins whose ends, bent at right angles, form angled projections which engage in the clear inner spaces of horizontal links, either all from above or all from below. The known chain conveyor offers the advantage that it can be produced at economical cost with comparatively low production effort due to its simplicity. The reason why it nonetheless fails to give full satisfaction resides in the fact that the connecting links connected to the coupling elements can execute undesirably extensive pivoting movements about their longitudinal axis which impair the reliability of the connection between the chain strands and the conveying members.

In order to eliminate the safety risks indicated, in the case of a chain conveyor known from German Offenlegungsschrift 3,304,601 two coupling elements which are connected to one another directly or by an intermediate piece are allocated to each connecting link and form a positive-fitting seating for the longitudinal sides of the connecting links which they encompass. The increased security of the second design is associated with a substantial increase in cost which militates against its use in many cases.

Finally, German Utility Model 1,853,977 has disclosed a chain conveyor with coupling elements which also possess angled projections, though in this case it is not the leg connected to the coupling element but the leg forming the angled end of the projection which protrudes into the free inner space of a connecting link, and does so without substantially filling the clear inner space of that link. In this design the legs of the projections which form the angled ends and engage in consecutive connecting links of the same chain strands do admittedly point in opposite directions, but even so the securing of the chain strands against rotary movements about their longitudinal axis does leave something to be desired, quite apart from the fact that the known chain conveyor presupposes an alternating arrangement, on opposite sides of the chain strand, of the coupling elements allocated to each chain strand.

SUMMARY OF THE INVENTION

The object of the present invention is to provide a multi-strand chain conveyor in which the conveyor members are each connected by one coupling element to the chain strands and in which, despite the use of comparatively simple coupling elements, adequate security against inadvertent slipping of the conveying members out of the chain strands is provided, at least in all the cases in which only a few chain links are arranged between the connecting links for two consecutive conveying members of one and the same pair of chain strands.

According to the invention, the above object is achieved, in the case of a multi-strand chain conveyor of the type considered, in that the projections of consecutive coupling elements in the chain strand direction which are assigned to the connecting links of the outer chain strands of the multi-strand chain conveyor engage into the clear inner spaces of the connecting links in a manner such that the other legs, forming their angled ends, point in different directions.

The chain conveyor according to the invention offers the advantage that in this case as a result of the change in the direction in which the projections engage into the connecting links, the extent of the pivoting movements of connecting links about their longitudinal axis is, in a surprisingly simple and effective manner, reduced to the extent that the risk of projections coming unhooked from the connecting links in the conventional, closely consecutive arrangement of conveying members is virtually eliminated. In other words, the conveying members are reliably connected to the chain strands not by the design and/or number of their coupling elements but by a skillfully selected different orientation of their coupling elements or the projections of the latter.

BRIEF DESCRIPTION OF THE DRAWINGS

The invention is explained in greater detail below with reference to the attached drawing, in which:

FIG. 1 shows a drag bar having two coupling elements of identical orientation A for a chain conveyor with pocket-type chain wheels, FIG. 2 shows a drag bar with two coupling elements of differing orientation, A and U respectively, for a chain conveyor having pocket-type chain wheels, FIG. 3 shows the situation of a chain link in a coupling element of orientation A according to FIG. 1, FIG. 4 shows the situation of a chain link in a coupling element of orientation U according to FIG. 2, FIG. 5 shows a drag bar with two coupling elements of identical orientation A for a chain conveyor having toothed chain wheels, FIG. 6 shows a drag bar with two coupling elements of different orientation, A and U respectively, for a chain conveyor having toothed chain wheels, FIG. 7 shows the situation of a chain link in a coupling element of orientation A according to FIG. 5, FIG. 8 shows the situation of a chain link in a coupling element of orientation U according to FIG. 6, FIG. 9 shows diagrammatically a first arrangement of coupling elements of a two-strand chain conveyor, FIG. 10 shows diagrammatically a second arrangement of coupling elements of a two-strand chain conveyor, FIG. 11 shows diagrammatically an arangement of coupling elements of a three-strand chain conveyor, FIG. 12 shows diagrammatically an arrangement of coupling elements of a five-strand chain conveyor.

DISCUSSION OF THE BEST MODES FOR CARRYING OUT THE INVENTION

Figure 13:
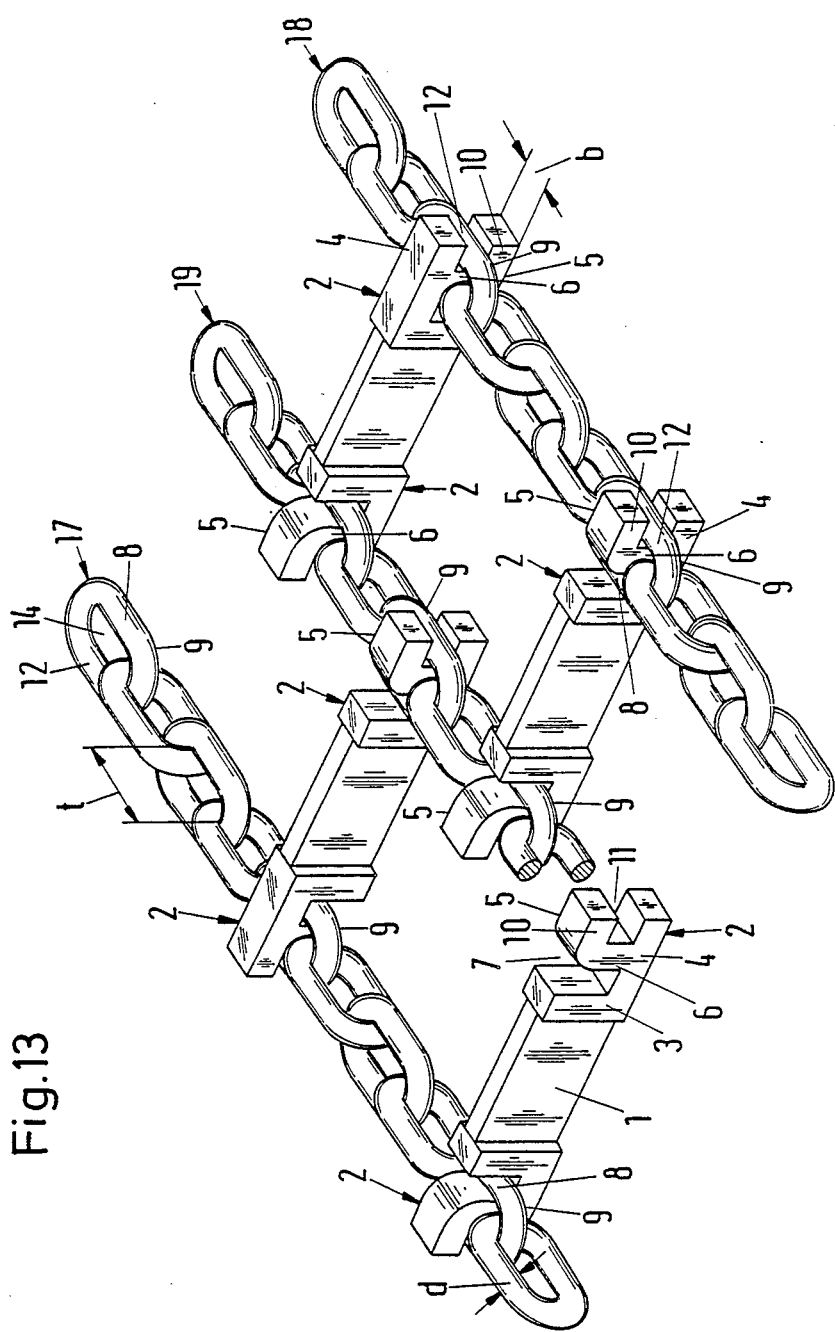
FIG. 13 shows a perspective view of part of a chain conveyor according to FIG. 11 with chain strands which can be driven by pocket-type chain wheels.

In FIG. 1, 1 is a conveying member designed as a drag bar to whose opposite ends are welded coupling elements 2 which are identical in respect to their shape and dimensions. Both coupling elements 2 possess a connecting part 3 and an extension arm 4 adjacent thereto. At a distance from the free end of the extension arm 4, the latter is provided with a projection 5, angled or bent at right angles, one leg 6 of which together with the connecting part 3 of the particular coupling element 2 forms a first guide slot 7 to receive the inward-lying link side 8 of a connecting link 9 (cf. FIG. 13), and the other leg 10 of which together with the free end of the extension arm 4 forms a guide slot 11 for the outward-lying link side 12 of the connecting link 9.

In the case of FIG. 1, both coupling elements 2 have the same orientation A, i.e. they engage from above into a horizontally lying connecting link 9, in the manner which is shown in FIG. 3.

In FIG. 2, by contrast, one of the coupling elements 2 connected to the conveying member 1 is so arranged that it has been rotated through 180° about its axis relative to the other. It has the orientation U and, as shown in FIG. 4, engages from below into the clear inner space 14 of a connecting link 9.

The coupling elements 2 shown in FIGS. 1 to 4 are intended for chain conveyors whose chain strands are driven by pocket-type chain wheels. FIGS. 5 to 8, by contrast, show conveying members 1, again designed as drag bars, of a chain conveyor whose chain strands can be driven by toothed chain wheels. In this case also the conveying members 1 are provided with identical coupling elements 15 at both their ends. In the case of the coupling elements 15, an extension arm 4 is lacking. Instead, the projection 5, again of angular shape, is joined directly to the connecting part 3.

The conveying member 1 according to FIG. 5 possesses two coupling elements 15 having downward-pointing projections 5, whose orientation is designated A. The coupling elements of the conveying member 1 according to FIG. 6, like the coupling elements 2 of the conveying member 1 according to FIG. 2, possess projections 5 of different orientations A and U. The manner of engagement of the projections 5 into vertical connecting links 9 is shown in FIGS. 7 and 8.

FIGS. 9 to 12 show possible arrangements of conveying members 1 designed as drag bars in the case of chain conveyors having 2, 3 and 5 chain strands. It could be seen that at least the consecutive coupling elements in the chain strand direction which are allocated to the connecting links of the outer chain strands 17, 18 in each case possess different orientations A and U respectively. As is clear from a comparison of the pairs of figures ⅔ and ⅘, as a result of the shape and the changing arrangement of the projections 5, twisting of the chain strands is prevented at least when the number of links situated between the coupling elements remains within limits. In practice this means that the distance between two consecutive coupling elements 2 and 15 connected to an outer chain strand 17 and 18 respectively should at most be equal to eight times the division t of the links of the chain strands. This of course does not exclude the achievement of a position-stabilizing effect for the chain strands even where greater distances exist between consecutive coupling elements 2 and 15 respectively.

In the part of a three-strand chain conveyor shown in FIG. 13, the distance between the coupling elements 2 allocated to the outer chain strands 17, 18 is at least equal to four times the link division t, i.e. a projection 5 engages in every second horizontal link of the outer chain strands 17, 18, while in the case of the middle chain strand 19 each horizontal link is used as a connecting link 9 for a coupling element 2. This solution is suitable for conveying heavy lumps of material with a drag bar conveyor, since the danger exists in this case that what are known as "fish", or discusshaped conveyed lumps, may push under the chain strand or a drag iron and lift the latter to a greater or lesser extent, thus tending to twist the chain strand. Moreover, further contribution to a satisfactory connection between the conveying members 1 and the chain strands 17, 18, 19 is made by the fact that the projections 5 of the coupling elements 2 almost completely fill the clear inner spaces of the connecting links 9, i.e. that the width b of the projection 5 is only slightly less than the difference between the division t and twice the nominal thickness d of the connecting links.

Figure 14:
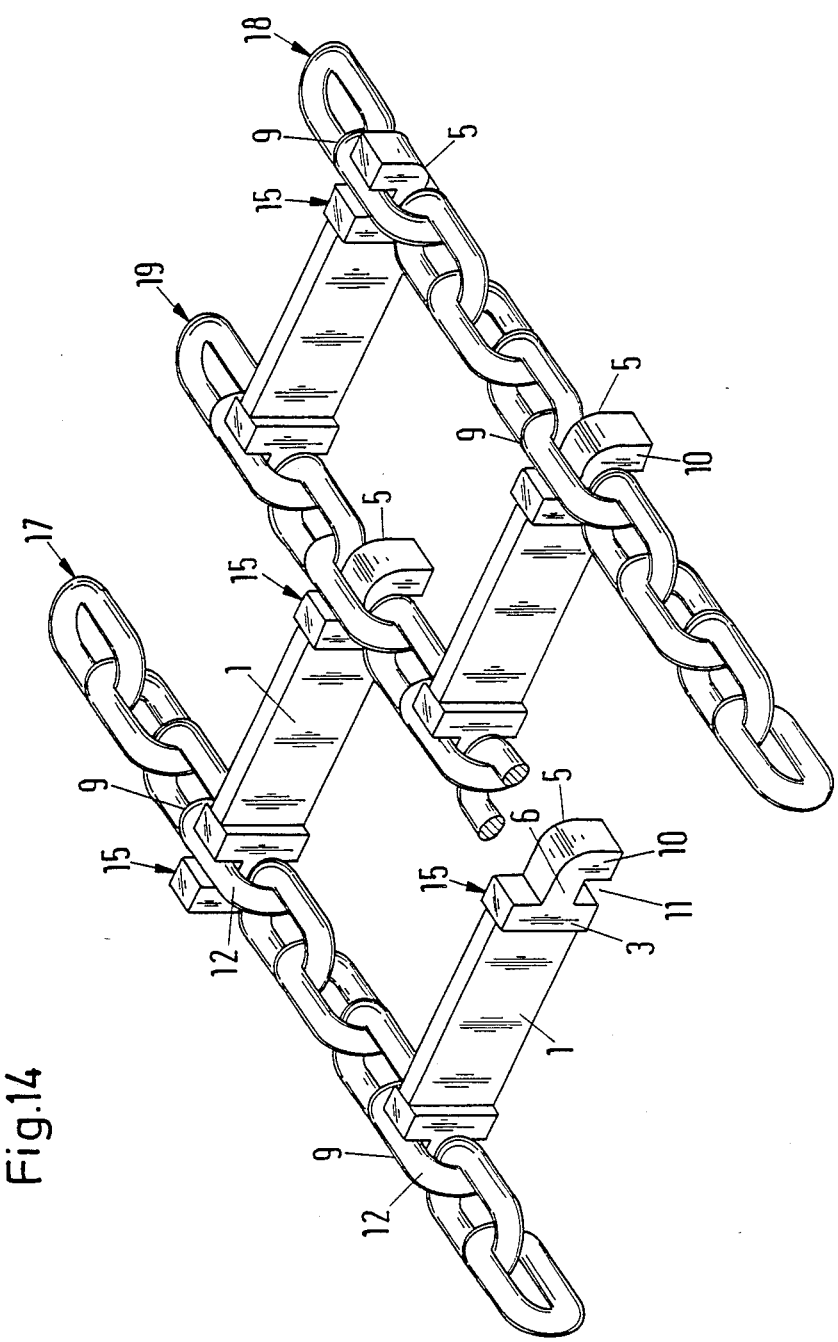
FIG. 14 shows a perspective view of part of a chain conveyor according to FIG. 11 with chain strands which can be driven by toothed chain wheels.

The chain strands 17, 18, 19 of the chain conveyor shown in FIG. 13 are, as already expressed, suitable for running over pocket-chain wheels. FIG. 14, by contrast, shows a three-strand chain conveyor whose chain strands 17, 18, 19 can be driven by toothed chain wheels. The connecting links 9 in this case are consequently oriented not horizontally but vertically.

I claim:

1. Mutli-strand chain conveyor, in which the conveying members (1) each are provided with two coupling elements (2,15) engaging in identically oriented connecting links (9) having a division t and having parallel longitudinal legs of adjacent chain strands (17, 18, 19), each of the coupling elements possessing an angled projection (5), one leg (6) of which largely fills the clear interior space of the connecting link associated to it and the other leg (10) of which, forming an angled free end, serves in each case as an abutment for one of the parallel longitudinal legs of the connecting chain link (9), characterized in that at least portions of said projection form parts of at least one guide slot for receiving one of said parallel legs of said connecting links, and said open end of said at least one guide slot of consecutive coupling elements in the chain strand direction which are assigned to the connecting links of the outer chain strands of said multi-strand conveyor are arranged and oriented to face in opposite directions.

2. Multi-strand chain conveyor according to claim 1, characterized in that the legs (6) of the projections (5) of at least two consecutive coupling elements (2, 15) in the chain strand direction which fill the clear interior space of the connecting links (9) of inner chain strands (19) lying between the outer chain strands (17, 18) engage into the clear inner spaces (14) of the connecting links (9) in the same orientation relative to said consecutive coupling elements.

3. Multi-strand chain conveyor according to claim 1, characterized in that the legs (6) of the projections (5), which engage into the clear inner spaces of the connecting chain links (9), extend from said coupling elements in the same orientation for some of the conveying members and extend away from said coupling elements in opposite orientation for others of the conveying members.

4. Multi-strand chain conveyor according to claim 1, characterized in that the width (b) of the projections (5)

is only slightly less than the difference between the division t and twice the nominal thickness d of the connecting links (9).

5. Multi-strand chain conveyor according to claim 1, characterized in that each projection (5) is arranged on an extension arm (4) at a distance from the free end thereof.

6. Multi-strand chain conveyor according to claim 5, characterized in that said other leg (10) of the projection (5), with a free end of the extension arm (4) extending parallel to it, forms a first guide slot (11) to receive one of said parallel legs (12) of one of said connecting links (9) and in that said one leg (6) of the projection (5), together with a connecting part (3) of the coupling element (2), forms a second guide slot (7) extending perpendicularly to the first guide slot (11) to receive the other of said parallel legs (8) of the same connecting link (9).

7. Multi-strand chain conveyor according to claim 1, characterized in that the distance between the consecutive coupling elements (2, 15) in the chain strand direction which elements are allocated to the outer chain strands (17, 18) is at most eight times the division t of the links of the chain strands.

8. Multi-strand chain conveyor according to claim 7, characterized in that a maximum of three further chain links are arranged between two consecutive connecting links (9) of the outer chain strands (17, 18).

9. Multi-strand chain conveyor according to claim 1, characterized in that its conveying members (1) are formed by drag bars.

10. Multi-strand chain conveyor according to claim 2, characterized in that the legs (6) of the projections (5), which engage into the clear inner spaces of the connecting chain links (9), extend from said coupling elements in the same orientation for some of the conveying members and extend away from said coupling elements in opposite orientation for others of the conveying members.

\* \* \* \* \*